US012221116B2

(12) United States Patent
Feser et al.

(10) Patent No.: US 12,221,116 B2
(45) Date of Patent: Feb. 11, 2025

(54) IDENTIFYING THE CONTOUR OF A VEHICLE ON THE BASIS OF MEASUREMENT DATA FROM AN ENVIRONMENT SENSOR SYSTEM

(71) Applicant: CONTINENTAL AUTOMOTIVE GMBH, Hannover (DE)

(72) Inventors: Michael Feser, Barbing (DE); Kilian Schneider, Augsburg (DE); Thomas Brandmeier, Wenzenbach Irlbach (DE); Alexander Kamann, Regensburg (DE); Robert Lugner, Ingolstadt (DE); Daniel Weichselberger, Denkendorf (DE); Robert Naumann, Bad Griesbach i. Rottal (DE)

(73) Assignee: Continental Automotive GmbH, Hannover (DE)

( * ) Notice: Subject to any disclaimer, the term of this patent is extended or adjusted under 35 U.S.C. 154(b) by 620 days.

(21) Appl. No.: 17/085,507

(22) Filed: Oct. 30, 2020

(65) Prior Publication Data
US 2021/0046940 A1    Feb. 18, 2021

Related U.S. Application Data

(63) Continuation of application No. PCT/DE2019/200031, filed on Apr. 16, 2019.

(30) Foreign Application Priority Data

May 2, 2018 (DE) .................. 10 2018 206 751

(51) Int. Cl.
*G01B 11/24* (2006.01)
*B60W 10/18* (2012.01)
(Continued)

(52) U.S. Cl.
CPC ............ *B60W 40/12* (2013.01); *B60W 10/18* (2013.01); *B60W 10/20* (2013.01); *B60W 10/30* (2013.01);
(Continued)

(58) Field of Classification Search
CPC ...... B60W 40/12; B60W 10/18; B60W 10/20; B60W 10/30; B60W 30/02; B60W 30/09;
(Continued)

(56) References Cited

U.S. PATENT DOCUMENTS 5,801,966 A * 9/1998 Ohashi .................. G01B 11/24
382/199
2005/0063592 A1* 3/2005 Li ........................ G06V 30/422
382/181
(Continued)

FOREIGN PATENT DOCUMENTS

CN    102576075 A    7/2012
CN    106918311    *  7/2017
(Continued)

OTHER PUBLICATIONS

Chen et al., "Polygonal path simplification with angle constraints" in Computational Geometry 32, No. 3 (Nov. 2005): 173-187. https://www.sciencedirect.com/science/article/pii/S0925772104001397?via%3Dihub (Year: 2005).*

(Continued)

*Primary Examiner* — Daniel M. Robert (57) ABSTRACT

A method for identifying the contour of a vehicle based on measurement data from an environment sensor system is disclosed. The measurement data includes a set of spatial points of an object detected by the environment sensor system. The method includes: producing an envelope in the form of a polygonal chain around the object based on the set of spatial points; reducing the set of spatial points; removing (Continued)

spatial points from the polygonal chain that are irrelevant to identifying the contour of the vehicle and determining spatial points of the polygonal chain that are relevant to identifying the contour of the vehicle; classifying one or more edges as belonging to a front and a side of the vehicle on the basis of the reduced set of spatial points.

9 Claims, 4 Drawing Sheets

(51) Int. Cl.
*B60W 10/20* (2006.01)
*B60W 10/30* (2006.01)
*B60W 30/02* (2012.01)
*B60W 30/09* (2012.01)
*B60W 30/095* (2012.01)
*B60W 40/12* (2012.01)
*B60W 60/00* (2020.01)
*G01S 13/931* (2020.01)
*G06T 7/13* (2017.01)
*G06T 7/181* (2017.01)
*G08G 1/16* (2006.01)

(52) U.S. Cl.
CPC ............ *B60W 30/02* (2013.01); *B60W 30/09* (2013.01); *B60W 30/0956* (2013.01); *B60W 60/0015* (2020.02); *G01B 11/24* (2013.01); *G01S 13/931* (2013.01); *G06T 7/13* (2017.01); *G06T 7/181* (2017.01); *G08G 1/16* (2013.01); *B60W 2420/403* (2013.01); *B60W 2420/408* (2024.01); *B60W 2520/00* (2013.01); *B60W 2555/00* (2020.02); *G06T 2207/10028* (2013.01); *G06T 2207/30241* (2013.01); *G06T 2207/30252* (2013.01)

(58) Field of Classification Search
CPC ......... B60W 30/0956; B60W 60/0015; B60W 2420/42; B60W 2420/52; B60W 2520/00; B60W 2555/00; G01B 11/24; G01S 13/931; G06T 7/13; G06T 7/181; G06T 2207/10028; G06T 2207/30241; G06T 2207/30252; G06T 7/12; G08G 1/16
See application file for complete search history.

(56) References Cited

U.S. PATENT DOCUMENTS

| | | | | |
|---|---|---|---|---|
| 2009/0040095 A1* | 2/2009 | Ogawa | | G01S 17/89 342/70 |
| 2012/0303258 A1* | 11/2012 | Pampus | | B62D 15/0285 701/300 |
| 2013/0332112 A1* | 12/2013 | Nakamura | | G01S 17/66 702/181 |
| 2014/0159925 A1* | 6/2014 | Mimeault | | G01S 17/86 340/935 |
| 2014/0365108 A1* | 12/2014 | You | | B62D 15/0285 701/408 |
| 2016/0280263 A1* | 9/2016 | Mori | | B62D 15/027 |
| 2017/0309182 A1* | 10/2017 | Murray | | G08G 1/0112 |
| 2017/0320437 A1* | 11/2017 | Liebau | | G01C 11/06 |
| 2019/0217856 A1* | 7/2019 | Inoue | | G08G 1/16 |
| 2019/0291722 A1* | 9/2019 | Maeda | | G01B 11/00 |
| 2019/0325607 A1* | 10/2019 | Ohnishi | | G06T 7/80 |
| 2020/0027266 A1* | 1/2020 | Chen | | G06T 17/10 |
| 2020/0043186 A1* | 2/2020 | Selviah | | G06T 7/33 |
| 2020/0349365 A1* | 11/2020 | Behrendt | | G05D 1/0223 |

FOREIGN PATENT DOCUMENTS

| | | | | |
|---|---|---|---|---|
| CN | 107003409 A | | 8/2017 | |
| CN | 104992447 B | * | 2/2018 | ........... G06T 7/0012 |
| DE | 102008037014 A1 | | 3/2009 | |
| DE | 102013008828 A1 | * | 11/2014 | ........ B60W 30/0956 |
| DE | 102015204214 A1 | | 11/2016 | |
| JP | 2554273 | * | 11/1996 | |
| KR | 10-1549155 | * | 10/2015 | |

OTHER PUBLICATIONS

Şadan Ekdemir, Efficient Implementation of Polyline Simplification for Large Datasets and Usability Evaluation (Uppsala University, 2011) (Year: 2011).*
En.wikipedia.org s.v. "Canny edge detector," accessed May 1, 2023 https://en.wikipedia.org/wiki/Canny_edge_detector (Year: 2023).*
Rieken et al., "Toward Perception-Driven Urban Environment Modeling for Automated Road Vehicles," IEEE 19th International Conference on Intelligent Transportation Systems (2015): 731-738. (Year: 2015).*
Dong et al., "Vehicle Target Identification Algorithm Based on Point Cloud of Vehicle 32-Line Laser Lidar," Science Technology and Engineering 18 No. 5 (2018): 81-85. (Year: 2018).*
German Search Report dated Dec. 18, 2018 for the counterpart German Application No. 10 2018 206 751.1.
International Search Report and the Written Opinion of the International Searching Authority dated Jun. 28, 2019 for the counterpart PCT Application No. PCT/DE2019/200031.
Rieken, et al. "Toward Perception-Driven Urban Environment Modeling for Automated Road Vehicles", Institute of Control Engineering, Technische Universitaet Braunschweig, Germany.
Chinese Office Action dated Apr. 26, 2024, in Chinese Patent Application No. 201980029192.X.
Vehicle target identification algorithm based on point cloud of vehicle 32-line laser lidar / Kong Dong, Wang Xiayuan, Liu Yaqiet al. / CN Feb. 18, 2018.

* cited by examiner

IDENTIFYING THE CONTOUR OF A VEHICLE ON THE BASIS OF MEASUREMENT DATA FROM AN ENVIRONMENT SENSOR SYSTEM

CROSS-REFERENCE TO RELATED APPLICATIONS

This application claims the benefit of International Application PCT/DE2019/200031, filed Apr. 16, 2019, which claims priority to German Application DE 10 2018 206 751.1, filed May 2, 2018. The disclosures of the above applications are incorporated herein by reference.

TECHNICAL FIELD

The disclosure relates to identifying the contour of a vehicle on the basis of measurement data from an environment sensor system.

BACKGROUND

Sensors and sensor systems for detecting other road users are increasingly being deployed in modern vehicles which are designed for at least partially autonomous driving. In particular, cameras, radar and, also in part, lidar sensors are deployed as sensors. A lidar sensor scans, by means of laser radiation, a determined spatial detection range and can establish, on the basis of the laser radiation reflected by objects in the detection range, spatial points of the objects. The spatial points are also referred to below as 3D measurement points since they include spatial coordinates.

The data produced by such sensors are algorithmically processed by driver assistance systems, in particular in order to identify objects in the driving corridor of a vehicle and to avoid possible accidents with identified objects. The algorithms deployed in driver assistance systems are usually configured, on the basis of sensor data, to mark identified objects by so-called "bounding boxes", that is to say enveloping bodies in the form of a box in the space or respectively of a rectangle in the plane, for further algorithmic processing.

For example, DE 10 2013 008 828 A1 discloses a method for identifying the contour of a vehicle on the basis of measurement data from an environment sensor system, where the measurement data include a set of contour points of a detected vehicle. On the basis of the contour points, a rectangle or polygon enveloping the vehicle is formed, wherein those contour points that are relevant to identifying the contour of the vehicle are determined for further processing. To this end, for each row and column of a formed grid map, the number of the contour points lying in the row or respectively column is determined in each case. For example, that column which lies in the left half of the grid map and includes most of the contour points forms the left edge of the rectangle describing the vehicle contour, and that row which lies in the lower half of the grid map and includes most of the contour points forms the lower edge of the rectangle describing the vehicle contour.

SUMMARY

A method for identifying the contour of a vehicle according to the disclosure on the basis of measurement data from an environment sensor system as well as a safety system for a vehicle according to the disclosure will now be described below.

According to a first aspect of the disclosure, a method for identifying the contour of a vehicle on the basis of measurement data from an environment sensor system is disclosed. The measurement data includes a set of spatial points of an object detected by the environment sensor system. The method includes the following: producing an envelope in the form of a polygonal chain around the object on the basis of the set of spatial points; reducing the set of spatial points by deleting all spatial points situated within the envelope; removing spatial points from the polygonal chain that are irrelevant to identifying the contour of the vehicle and determining spatial points of the polygonal chain that are relevant to identifying the contour of the vehicle; classifying one or more edges as belonging to a front and a side of the vehicle on the basis of the reduced set of spatial points. The above actions may be executed in the indicated sequence as steps of an algorithm. The envelope may, for example, be a convex envelope or may be formed by a cubic Hermite spline. In contrast to a relatively inexact bounding box, the contour of a vehicle identified by the method is, above all, advantageous if, as for example during the actuation of passive safety elements, it is a question of predicting an accident as reliably as possible. For example, on the basis of the identified contour of another vehicle, the probability of a crash between the ego-vehicle and the other vehicle can be assessed more exactly and the actuation of a passive safety element is improved in that, for example, unnecessary or incorrect triggerings of the passive safety element may be avoided or so-called pre-crash triggerings may be adjusted more exactly.

In addition, the method may include the following: complementing a complete form of the vehicle by way of the estimation of a central axis of the vehicle on the basis of the classified edges. As a result, the identification of the contour may be further improved since an even more exact contour of the vehicle is obtained.

In some examples, producing an envelope in the form of a polygonal chain around the object on the basis of the set of spatial points can include performing a Graham's scan algorithm on the set of spatial points. The Graham's scan algorithm makes it possible to efficiently calculate the envelope around the object, including in the case of relatively large quantities of data such as those which can be produced, for example, by a lidar-based environment sensor system.

Removing spatial points from the polygonal chain that are irrelevant to identifying the contour of the vehicle includes the following: deleting spatial points on the envelope, the straight connecting lines of which to adjacent spatial points of the polygonal chain are at an angle with respect to one another that is less than or equal to a predetermined angle of 2°, for example, and connecting the spatial points connected to the deleted spatial point in the polygonal chain. As a result, spatial points may be removed from the polygonal chain which do not constitute corner points of the vehicle contour and, therefore, are as a rule of little importance, if any, for an accident prediction.

Determining spatial points of the polygonal chain that are relevant to identifying the contour of the vehicle may include at least one of the following: determining a spatial point as relevant if its straight connecting lines to adjacent spatial points of the polygonal chain are at an angle with respect to one another that is greater than a predetermined angle of 20°, for example; determining a spatial point as relevant if, for the spatial point and multiple spatial points adjacent to it in the polygonal chain, the sum of the angles at which straight connecting lines to adjacent spatial points of the polygonal chain are with respect to one another is greater than a predetermined angle of 17.5°, for example; determining a spatial point as relevant if the angle at which straight connecting lines to adjacent spatial points of the polygonal chain are with respect to one another, multiplied by the length of at least one of the straight connecting lines, exceeds a predetermined value of 8° m, for example. Each of these three determination methods makes it possible to efficiently establish spatial points relevant to identifying the contour. Classifying one or more edges as belonging to a front and a side of the vehicle on the basis of the reduced set of spatial points may include the following steps: sorting the straight connecting lines of the reduced set of spatial points of the polygonal chain according to their length, comparing the two longest straight connecting lines with a front parameter $l_f$ and a side parameter $l_s$, and determining whether the front and/or side of the vehicle is or respectively are visible.

Determining whether the front and/or side of the vehicle is or respectively are visible can, for example, include at least one of the following: determining that the front and side are visible if the longest connecting line is longer than the front parameter $l_f$ and the second longest connecting line lies between the front parameter $l_f$ and the side parameter $l_s$; determining that only the front is visible if the longest connecting line is shorter than the side parameter $l_s$, but is longer than the front parameter $l_f$; determining that only the side is visible if the longest connecting line is longer than the front parameter $l_f$ and the second longest connecting line is shorter than the side parameter $l_s$.

Furthermore, complementing a complete form of the vehicle by way of the estimation of a central axis of the vehicle on the basis of the classified edges may include the following steps: producing a central axis by placing a straight line through the midpoint of a classified front of the vehicle in such a manner that the straight line lies approximately parallel to a classified side of the vehicle, reflecting the classified front and side of the vehicle off the central axis, and overwriting spatial points on the side of the central axis, off which reflection occurred, by the reflected spatial points.

In some examples, the method can be executed cyclically and a trajectory of the vehicle can be established by evaluating the complemented complete forms of the vehicle. For example, a temporal change of multiple complemented complete vehicle forms can be established, such as the change in the angle of a vehicle longitudinal axis of the complemented complete vehicle forms, on the basis of which a trajectory of the vehicle can then be deduced, for example whether the vehicle is moving on a trajectory which goes past the ego-vehicle. This can then be evaluated by a safety or driver assistance system, for example in order to predict an accident.

According to a second aspect of the disclosure, a safety system for a vehicle is provided, where the safety system is configured to execute a method as disclosed herein and to actuate at least one of the following elements as a function of the identified contour of the vehicle: at least one passive safety element, such as, for example an airbag, a belt tensioner; at least one active safety element, such as, for example a brake assist system, an active steering device, an antilock braking system, a vehicle dynamics control system.

The safety system may be configured, as a function of the identified contour of the vehicle, to assess the probability of an accident with the vehicle and, as a function of the assessment, to control the triggering of the at least one element.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

In the following description, similar, functionally similar and functionally related elements are provided with the same reference numerals. Absolute values are only indicated by way of example below and are not to be understood to be restrictive.

The embodiment examples explained below are to be fundamentally classed in the field of vehicle safety for all steps of automated up to fully autonomous driving, wherein, within these fields, the focus is on the early triggering of passive safety elements such as airbags and belt tensioners with the aid of sensors for detecting the environment and collision partners. In general, the methods and systems described herein are, however, suitable for all types of driver assistance systems, in which object identification is deployed for vehicle safety, that is to say by way of example also active safety systems which can influence the control of the vehicle in order to avoid accidents such as, for example, automatic steering, braking and driving dynamics control interventions.

In the case of driver assistance systems currently deployed in vehicles, the environment is predominantly detected with radar and camera sensors, the information of which can already be used, for example, to lower ignition thresholds of actuators of passive safety elements. However, to date, the actuators are still activated after the time t0 of the first contact of two parties involved in an accident.

A further minimization of the severity of the accident for the occupants may be achieved by triggering protective and restraining means, for example belt tensioners or airbags, before t0. However, as much information as possible regarding the collision partners must be available for this. This includes, inter alia, the speed and the position which can be determined with the indicated sensor system. Further relevant parameters can, however, only be determined in a very limited manner or not at all, which is why a lidar sensor (or laser scanner) may be used in vehicles as a third environment detecting sensor. By virtue of the high number of measurement points in the space or respectively 3D measurement points, which may be supplied by the sensor data of a lidar sensor, using a lidar sensor makes it possible to calculate a vehicle contour of the other vehicle involved in the accident. Thus, the point of impact of the other vehicle involved in the accident with the ego-vehicle as well as the overlap of the other party involved in the accident may be assessed with greater precision. A method is described below, with which the estimation of a simple bounding box (enveloping body in the form of a cuboid in the space or respectively of a rectangle in the plane) may be increased to a detailed application for identifying the contour of approaching vehicles in pre-crash situations.

Nowadays, when objects surrounding the ego-vehicle are detected by environment sensors of a vehicle, the silhouette as well as the precise dimensions of these objects are not determined. Bounding boxes (smallest possible, axially parallel rectangle which encloses a predetermined set of objects or measurement points in the plane) are merely placed around the individual objects, without taking account of the exact object form. In this way, valuable information regarding the object or respectively an identified vehicle that can be relevant to a triggering of passive safety elements such as the ignition of restraining means is lost.

Figure 1:
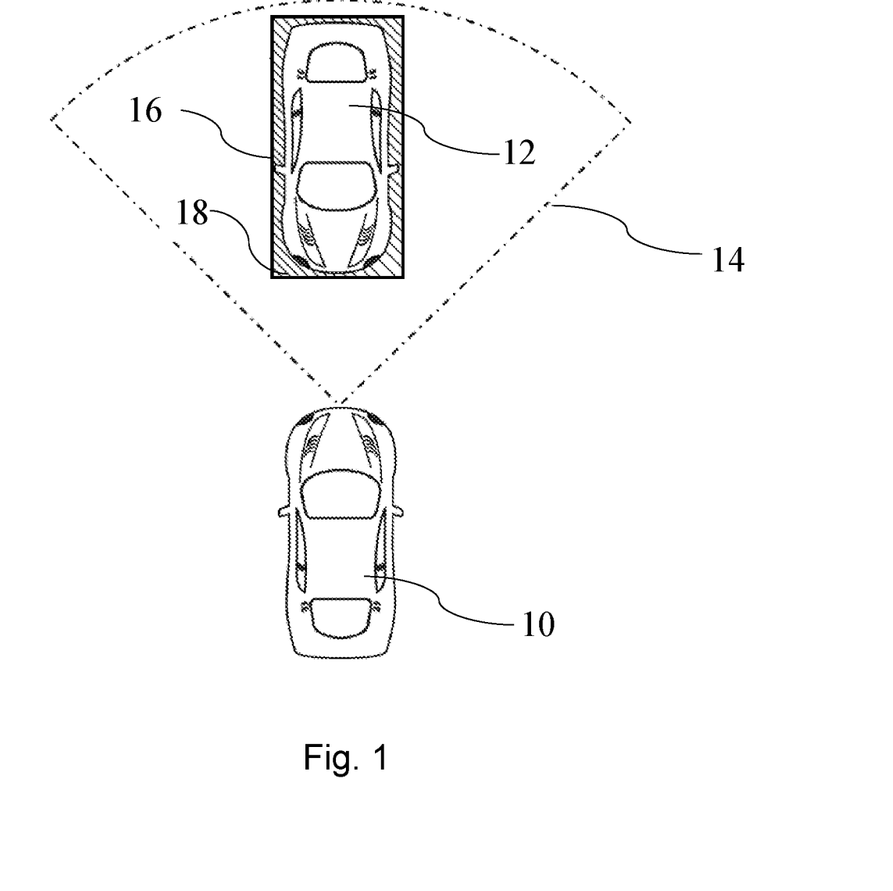
FIG. 1 shows an ego-vehicle having an environment sensor system for detecting objects and a target vehicle approaching the ego-vehicle.

FIG. 1 illustrates the problem on the basis of a simplified representation of an identified vehicle. The target vehicle 12 is located in the field of view (circular segment bordered by the dotdashed line) or respectively sensor detection range 14 of the ego-vehicle 10. The sensor detection range 14 corresponds to the detection range of the environment sensor system deployed in the ego-vehicle 10 for detecting objects in front of the vehicle, i.e. in the usual direction of travel. The environment sensor system has, for example a radar, a lidar and/or a camera as sensors. The target vehicle 12 is detected as an approaching vehicle by the environment sensor system and is integrated into the environment model of a driver assistance system of the ego-vehicle 10. This integration is not, however, effected in the form of the actual target vehicle, but in the form of a bounding box 16 (depicted in FIG. 1 by a black rectangle 16 around the target vehicle 12). The target vehicle 12 is accordingly stored as a larger and more inexact object 16 in the system than it is in reality. The error is depicted as a black and white striped area 18 around the target vehicle 12.

Figure 2:
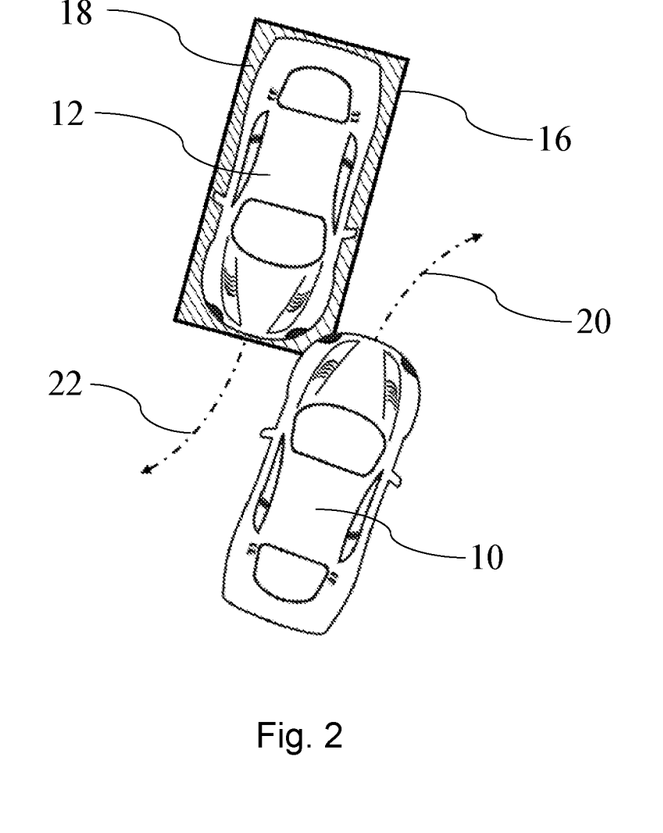
FIG. 2 shows an ego-vehicle and a target vehicle approaching the ego-vehicle as well as the trajectories of the vehicles during an evasive maneuver in order to avoid an accident.

If a passive safety element is now to be triggered, this can result in erroneous triggerings as a consequence of the oversized hypothesis of the target vehicle 12. An imminent collision including a crash constellation and severity is predicted by virtue of the intersection of the contours between the bounding box 16 and the ego-vehicle 10, which is why the passive safety elements, such as the restraining means, are activated. In reality, however, a completely different crash constellation and, thus, crash severity can occur, right up to the complete avoidance of the accident as a result of the vehicles simply passing one another. That is to say the collision may possibly not take place, although both vehicle objects 10 and 12 do meet in the prediction (intersection of the bounding box 18 of the target vehicle 12 with the ego-vehicle 10, but no intersection of the real vehicle contours of the vehicles 10 and 12). This is illustrated by way of example in FIG. 2: the trajectory 20 of the ego-vehicle 10 passes the trajectory 22 of the target vehicle 22, so that there is, in actual fact, no crash between two vehicles 10 and 12. Admittedly, the driver assistance system does predict a crash since it only considers the bounding box 16 of the target vehicle 12, and this does collide at the front with the left fender of the ego-vehicle 10 in the prediction.

Erroneous triggerings, caused by the application of this simplified "Bounding Box" method without exact contour determination, cannot be tolerated for a secure pre-crash triggering of actuators of passive safety elements. Hence, knowledge of the exact contour of the target vehicle 12 is to be guaranteed. An explanation is provided below of how this technical problem can be solved by the method presented herein for identifying the contour of approaching vehicles in pre-crash situations.

As already explained, the objective is to estimate the contour of an approaching vehicle as precisely as possible in the pre-crash phase. This precise calculation fulfils the algorithm described below, for example, in four successive steps "producing a convex envelope around the object", "determining the decisive corner points", "classifying the vehicle front and side" as well as a final "complementing the complete vehicle form by way of the estimation of a central axis". The latter step of complementing is optional and serves, above all, to increase the exactness of the contour identification.

Producing a Convex Envelope Around the Object

Recourse is had to the known Graham's scan algorithm, which is distinguished by its short running time and high efficiency, as the basis of the convex envelope. This algorithm was presented in 1972 by the mathematician Ronald Lewis Graham. Here, a starting point P0 must first be defined, where the point having the smallest y-coordinate and x-coordinate is always used, since this must inevitably include a corner point in this method. All of the other points are then arranged in ascending order according to the angle between P0 and the x-axis in an anticlockwise manner. It is then tested whether three points form a positively oriented triangle, which is checked by way of a determinant. If this is the case, the outer lines of the triangle are specified as the outer envelope. If a triangle is negatively oriented, the calculation is restarted, where the middle point is skipped. This procedure is repeated until such time as the starting point is reached again and, as a consequence, the convex envelope has been completed. Finally, the connection between the points having the lowest and highest x-coordinate is deleted in order to only obtain the form which can also be seen by the lidar. The convex envelope thus obtained now corresponds to a polygonal chain, in which pairs of spatial points which define the envelope are connected to one another by connecting sections or respectively straight connecting lines.

Determining the Relevant or Respectively Decisive Corner Points

In the next step, corner points are crystallized out of the polygonal chain, from which the estimation of the exact vehicle contour is constructed and the vehicle longitudinal axis is deduced (relevant or respectively decisive corner points or respectively spatial points). Since the lidar point cloud represents an immense quantity of data, the majority of which is admittedly not used, the measurement data are reduced at this point. On the one hand, all of the points within the convex envelope are deleted, on the other are all of the points in which the connecting sections or respectively straight connecting lines of a spatial point of the polygonal chain include a negligibly small angle, i.e. are at a negligibly small angle with respect to one another.

Figure 3:
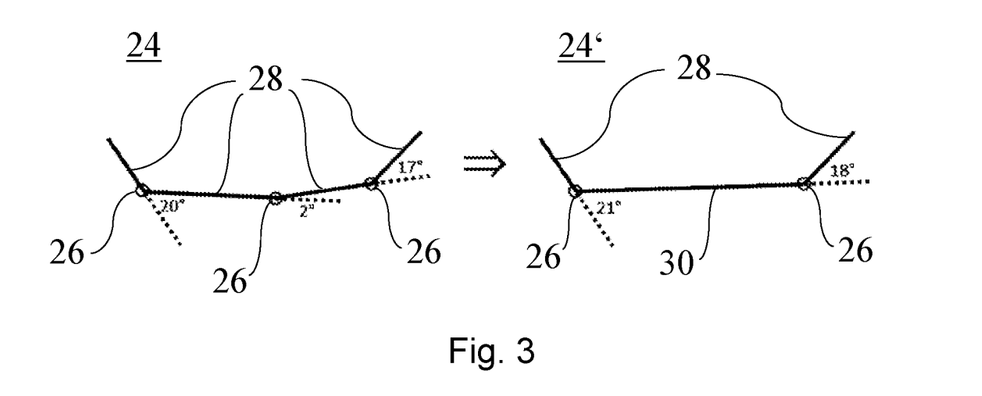
FIGS. 3 to 5 shows examples of polygonal chains having corner points.

This is illustrated by an example depicted in FIG. 3 of a short polygonal chain before 24 and after 24' a determination of the relevant or respectively decisive corner points: a polygonal chain 24 having three corner points 26 is depicted on the left in FIG. 3. The straight connecting lines 28 of the corner points are at an angle of 20° in the left corner point, at an angle of 2° in the central corner point and at an angle of 17° in the right corner point with respect to one another. In this example, the limit for the angles is fixed at 2°. This means that the algorithm only classifies corner points as decisive or respectively relevant if the straight lines penetrating a corner point are at an angle >2° with respect to one another. As a result, all of the corner points are deleted, in which the penetrating straight lines are at an angle of <=2° with respect to one another. In the example shown in FIG. 3, the central corner point is therefore deleted from the algorithm, and the left and right corner points are again connected to one another by a new straight line 30, so that the transformed polygonal chain 24' on the right in FIG. 3 is created.

The relevant corner points are subsequently defined from the remaining measurement points. For this purpose, it is checked whether they satisfy one of the following conditions, in particular arranged in descending order from a) to c). If a point has already been defined as a corner point, it may be provided that the further conditions no longer have to be met. It should be further noted that the two points having the lowest and highest x-coordinate automatically represent corner points.

a) Change by Way of Large Angle

A large change in angle on the structure of vehicles goes hand in hand with pronounced radius changes such as, for example, the transition from the lights to the fenders. Therefore, a corner point is produced at locations which have an angle transition of greater than 20°, for example.

b) Totalized Small Angles

Figure 4:
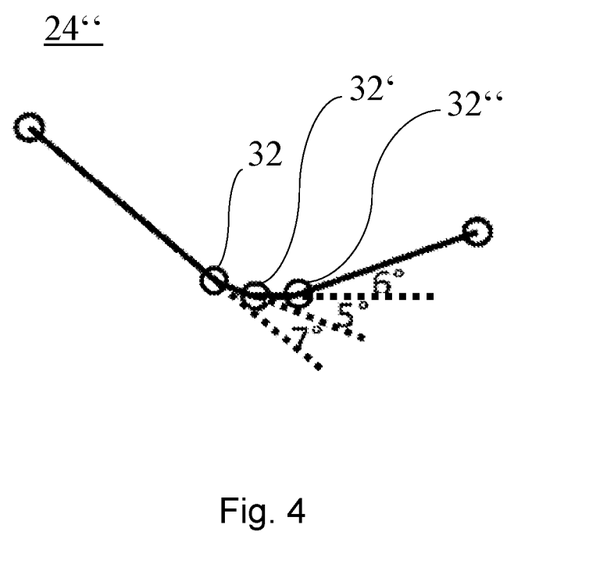

This observation is mainly directed at the transitions between the radiator grill of the vehicle and the lights. To this end, all of the points which lie within a specified length (for example 20 cm) are examined for their change in angle and the individual values are added up. If this total is, for example, above a limit of 17.5°, a corner point is defined on this segment. The coordinates of this point are calculated from the arithmetical averages of all of the points involved. One example is shown in FIG. 4: in the depicted polygonal chain 24", three corner points 32, 32', 32" lie approximately in the middle on a specified length. The straight connecting lines which penetrate these corner points are at angles of 7°, 5° and 6° with respect to one another. The sum of the angles is 18° and lies above the limit of 17.5° stated above by way of example, so that a corner point can be defined on the segment of the polygonal chain 24" comprising the three corner points 32, 32', 32".

c) Weighting by Way of Line Length

Figure 5:
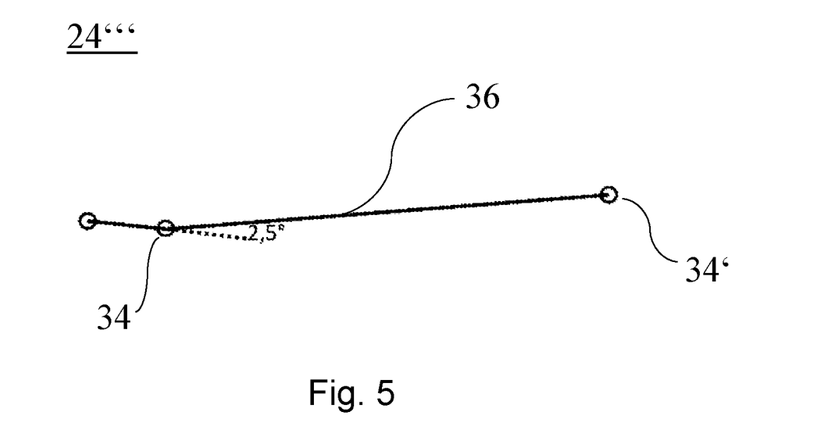

A definition of corner points solely by way of the angle between the straight lines based on the previous filtering is frequently not sufficient for the side structures of a vehicle. It can therefore be necessary to also include the length of the adjoining straight lines in the establishment thereof. To this end, the angle is multiplied by the straight lines and, as a consequence, is weighted. If a limiting value (for example 8° m) is exceeded during this, the point is determined as a corner point. FIG. 5 shows an example: the length of the straight lines 36 between the two points 34 and 34' is multiplied by the angle 2.5° which is enclosed by the straight lines penetrating the corner point 34. The value thus obtained is compared with a limit; if the limit is exceeded, the point 34 is classified as the corner point, otherwise it is deleted.

In the event that the target vehicle is approaching the ego-vehicle absolutely head-on, it is already possible to classify the vehicle front structure. If the target vehicle is driving towards the ego-vehicle at an angle, a vehicle side can additionally be classified. This takes place by taking account of the movement history of the tracked vehicle.

Classification of the Vehicle Front and Side

Following the determination of the corner points, the contour now exists in a simplified manner on a basis of, for example, six to eight points. The vehicle front, side as well as the headlights can be deduced from this. The backdrop to this is the desired determination at which angle the target vehicle is oriented with respect to the ego-vehicle.

For that reason, all of the lines are first sorted in ascending order according to their length. The two longest lines are subsequently compared with two parameters if (for example=1.60 m) for the front and is (for example=0.55 m) for the side. Here, four cases may be distinguished, which make it possible to make a clear decision regarding the visible vehicle parts. These are depicted in the following table (Table 1):

TABLE 1

| Case | Meaning | Description |
|---|---|---|
| 1 | Front and side are visible | The longest line is longer than $l_f$ and the second longest line lies between $l_f$ and $l_s$. |
| 2 | Only front visible | The longest line is shorter than $l_s$, but longer than $l_f$. If the two longest lines meet this, the line having the larger angle to the ego-vehicle is selected. |
| 3 | Only side visible | The longest line is longer than $l_f$ and the second longest is shorter than $l_s$. |
| 4 | No side identifiable/ lidar impaired | None of cases 1, 2 or 3 are fulfilled. |

A vehicle contour may already be identified with a relatively high exactness with the above steps, such as a vehicle front and, if applicable, a vehicle side, which constitutes an improvement compared with a simple bounding box or respectively a cuboid as a digital representation of a vehicle, since the vehicle contour identified with this method corresponds more exactly to the real vehicle contour.

Complementing the Complete Vehicle Form by Way of the Estimation of a Central Axis With this last step, the identification of the contour may be further improved in that a virtually complete vehicle form or respectively vehicle silhouette may be established, even if parts of the vehicle are concealed or respectively cannot be identified by a lidar sensor. To this end, the vehicle longitudinal axis is first determined. It is necessary to determine the vehicle longitudinal axis in order to obtain the entire vehicle silhouette if a part of the target vehicle is concealed or parts of the vehicle are not visible to the environment sensor system. For this purpose, a straight line is placed through the midpoint of the identified front structure, which lies parallel to the visible vehicle side. Finally, the vehicle contour facing the ego-vehicle is reflected off the central axis. The points on the other side of the central axis are overwritten with the new, reflected corner points.

In the case of a target vehicle which is moving head-on towards the ego-vehicle, the vehicle longitudinal axis can likewise be determined, with the aim of increasing the exactness of the overlap estimation. An orthogonal through the midpoint of the identified vehicle front defines, in this case, the longitudinal axis. By way of a time-dependent, consecutive observation of the target or respectively a determination of the target parameters of width and yaw angle, the exactness of the location of the central axis may, in addition, continually increase gradually.

The back of the target vehicle cannot be determined in such a detailed way, but can be simply fleshed out by way of a connection of the rear corner points. The reason for this is that it is not visible to the lidar. However, this is not to be deemed as a problem, since the exact form of the vehicle back is not important if an accident occurs.

Figure 6:
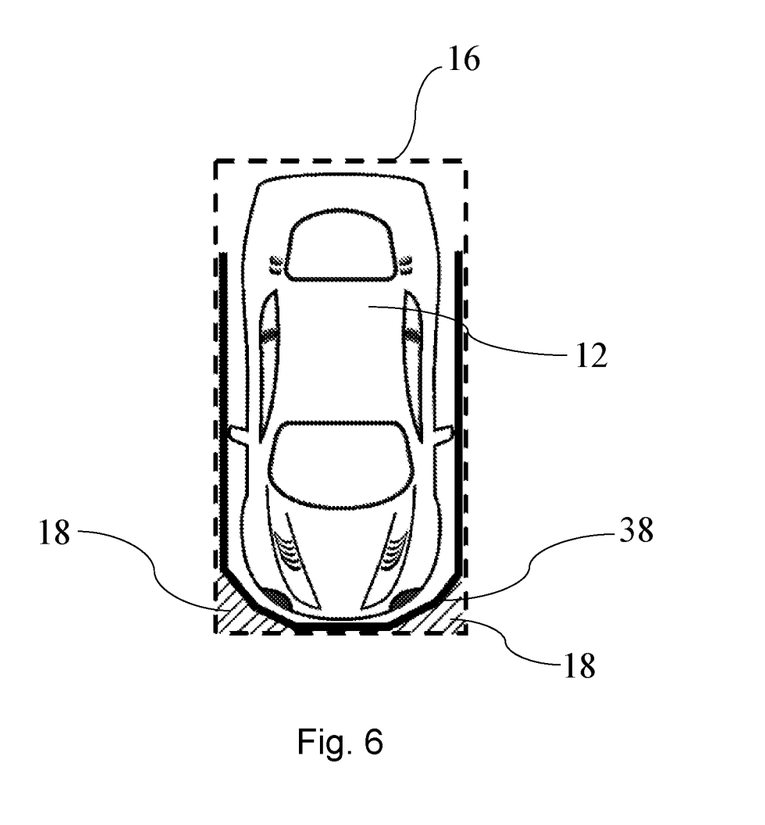
FIG. 6 shows an example of a vehicle contour identified with the method.

The end result is, consequently, a complete contour estimation of the target vehicle, as illustrated in FIG. 6 by way of example on the basis of the border 38 around the target vehicle 12.

At the same time, FIG. 6 also shows the major advantage compared with today's systems. The target vehicle 12 is clearly identified much more exactly than previously with the new method, as a result of which the resulting overhanging regions 18 estimated with a bounding box 16 (hatched area) are dispensed with. The uncertainties arising due to the regions 18, which can lead to erroneous triggerings, are completely removed, whereby the safety of the accident prediction can be significantly increased. Consequently, this algorithm for the improved identification of the contour of parties involved in an accident during a pre-crash phase can remedy a significant problem during the activation of passive safety actuators (unnecessary triggerings, erroneous triggerings).

A number of implementations have been described. Nevertheless, it will be understood that various modifications may be made without departing from the spirit and scope of the disclosure. Accordingly, other implementations are within the scope of the following claims.

What is claimed is:

1. A method for identifying a contour of a vehicle, the method comprising:
producing a convex envelope in the form of a polygonal chain around the vehicle, the polygonal chain comprising pairs of spatial points that define the convex envelope connected to each other by connecting lines;
determining from among the spatial points at least one corner point of the vehicle, wherein the determining comprises:
determining for each spatial point in the polygonal chain whether an angle between connecting lines adjacent to the spatial point of the polygonal chain is greater than a second predetermined angle and selecting the spatial point as the at least one corner point in response to determining that the angle is greater than the second predetermined angle;
determining for spatial points in the polygonal chain within a specified length of the polygonal chain whether a sum of angles of connecting lines between the spatial points within the specified length is greater than a third predetermined angle and selecting the at least one corner point based on the spatial points within the specified length in response to determining that the sum is greater than the third predetermined angle; and
determining for each spatial point in the polygonal chain whether a product of angles at which connecting lines to the adjacent spatial point of the polygonal chain, multiplied by a length of at least one of the connecting lines to the adjacent spatial point, is greater than a predetermined value and selecting the spatial point as the at least one corner point in response to determining the product is greater than the predetermined value; and
determining a contour of at least one of a front of the vehicle and a side of the vehicle based on the at least one corner point of the vehicle.

2. The method according to claim 1, further comprising:
generating a transformed polygonal chain around the vehicle from the polygonal chain; and
selecting the at least one corner point from among spatial points of the transformed polygonal chain.

3. The method according to claim 2, wherein generating the transformed polygonal chain comprises:
determining for each spatial point in the polygonal chain an angle between (i) a first line among the connecting lines in the polygonal chain connecting the spatial point and a previous spatial point on the polygonal chain and (ii) a second line among the connecting lines in the polygonal chain connecting the spatial point and a subsequent spatial point on the polygonal chain;
deleting each spatial point in the polygonal chain having an angle less than a predetermined angle; and
connecting remaining spatial points in the polygonal chain with connecting lines as the transformed polygonal chain, and
wherein determining the at least one corner point comprises determining the at least one corner point from among the spatial points of the transformed polygonal chain.

4. The method according to claim 3, wherein producing the convex envelope comprises:
obtaining a set of spatial points of the vehicle by LIDAR scanning; and
performing a Graham's scan algorithm on the set of spatial points of the vehicle.

5. The method according to claim 3, wherein the predetermined angle is 2°, the second predetermined angle is 20°, the third predetermined angle is 17.5°, and the predetermined value is 8° per meter.

6. The method according to claim 3, wherein determining the contour of the at least one of the front of the vehicle and the side of the vehicle comprises:
sorting the straight connecting lines of spatial points of the transformed polygonal chain according to length;
comparing two longest straight connecting lines with a front parameter and a side parameter; and
determining the front and/or the side of the vehicle based on a result of the comparing.

7. The method according to claim 6, wherein determining the contour of the front and/or the side of the vehicle comprises:
determining the front of the vehicle and the side of the vehicle if a longest connecting line is longer than the front parameter and a second longest connecting line lies between the front parameter and the side parameter;
determining only the front of the vehicle if the longest connecting line is shorter than the side parameter, but is longer than the front parameter; and
determining only the side of the vehicle if the longest connecting line is longer than the front parameter and the second longest connecting line is shorter than the side parameter.

8. The method according to claim 7, further comprising complementing a complete form of the vehicle by estimating a central axis of the vehicle, the estimating comprising:
determining the central axis by placing a straight line through a midpoint of a classified front of the vehicle in such a manner that the straight line lies approximately parallel to a classified side of the vehicle;
reflecting the classified front and side of the vehicle off the central axis; and
overwriting spatial points on the side of the central axis, off which reflection occurred, by the reflected spatial points.

9. The method according to claim 8, further comprising determining a trajectory of the vehicle based on a result of the overwriting.

\* \* \* \* \*